March 22, 1949.   D. E. NORGAARD   2,465,113
PULSE ECHO SYSTEM
Filed Feb. 14, 1945   2 Sheets-Sheet 1
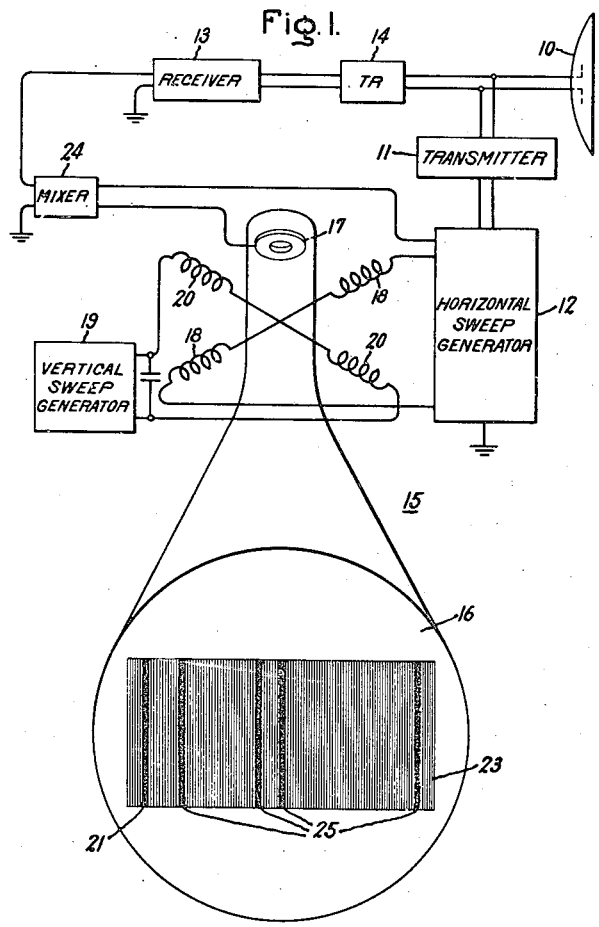
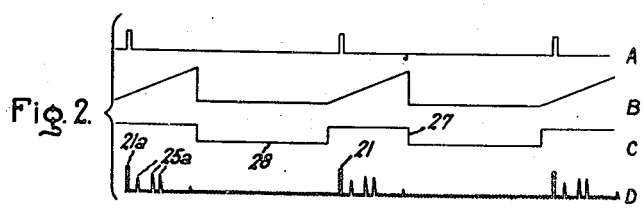
Inventor:
Donald E. Norgaard,
by Harry E. Dunham
His Attorney.

March 22, 1949.　　　　D. E. NORGAARD　　　　2,465,113
PULSE ECHO SYSTEM
Filed Feb. 14, 1945　　　　　　　　　　　　　2 Sheets-Sheet 2
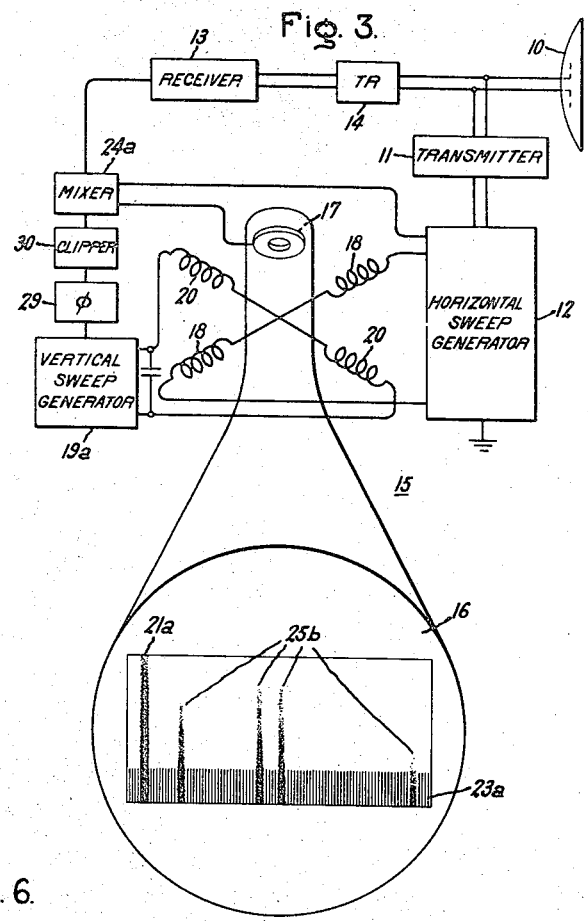
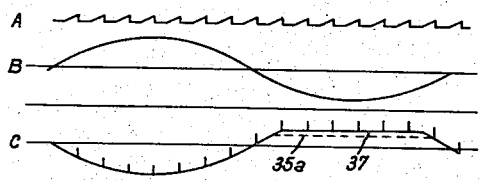
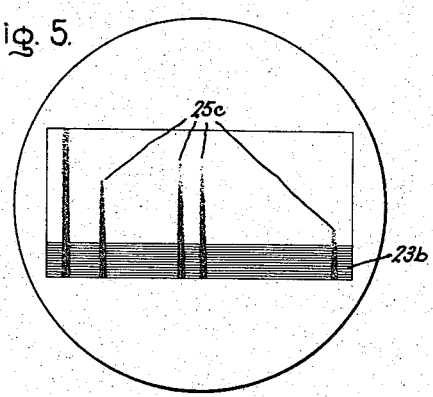
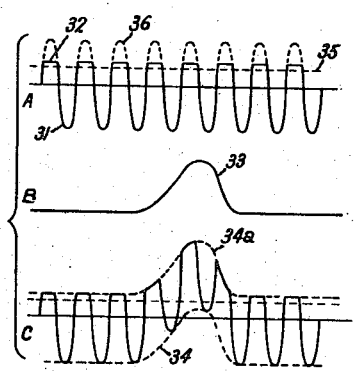
Inventor:
Donald E. Norgaard,
by Harry E. Dunham
His Attorney.

Patented Mar. 22, 1949

2,465,113

UNITED STATES PATENT OFFICE 2,465,113

PULSE ECHO SYSTEM

Donald E. Norgaard, Scotia, N. Y., assignor to General Electric Company, a corporation of New York Application February 14, 1945, Serial No. 577,779

5 Claims. (Cl. 343—11)

My invention relates to pulse echo systems and more particularly to the presentation of intelligence transmitted and received by such systems.

Many methods of displaying pulse echoes on cathode ray tubes have been devised. One is the so-called "A" type in which the signals are displayed as ordinates versus time (or range) as abscissas. An advantage of the "A" type of display is that relative signal strengths can be determined easily by inspection of the display alone since the height of the vertical display indicating the pulse echo is dependent upon the strength of the signal.

Magnetic deflection of the cathode ray beam is desirable for certain types of display, but such a type of deflection heretofore has required a very large amount of apparatus to produce an "A" type of display on the face of a cathode ray tube because of the necessity for wide band response along the vertical axis. Hence, the "A" type presentation is ordinarily feasible with electrostatic deflection only.

In portable apparatus, several types of display might be desirable, some types being well adapted to magnetic deflection and others being of the "A" type. In portable equipment, any system which would allow the selection of one of several types of display on one tube without excessive complication would result in a saving of space and weight.

It is an object of my invention to produce an "A" type of display of pulse echo signals on a cathode ray tube employing magnetic deflection.

It is another object of my invention to provide a pulse echo display system capable of permitting the selection of one of several types of display on one tube without excessive complication of equipment.

The features of my invention which I believe to be novel are set forth with particularity in the appended claims. My invention itself, both as to its organization and manner of operation, together with further objects and advantages thereof may best be understood by reference to the following description taken in connection with the accompanying drawing in which Fig. 1 is a schematic diagram of a pulse echo system embodying certain principles underlying my invention, Fig. 2 is a diagram illustrating certain features of the electrical operation of the system shown in Fig. 1, Fig. 3 is a schematic diagram of a particular embodiment of my invention, Fig. 4 illustrates the operation of the system shown in Fig. 3, Fig. 5 represents a further embodiment of the display shown in Fig. 3, and Fig. 6 is a diagram illustrating certain features of the electrical operation of the modification of the circuit of Fig. 3 required to give the display in Fig. 5.

In Fig. 1 there is shown in block form a pulse echo system embodying certain principles underlying my invention. There is shown radio locating equipment having a directional antenna 10 connected to a transmitter 11 keyed by a horizontal sweep generator 12 to transmit directional pulses of radio frequency waves at a desired repetition rate. The antenna is also connected to a receiver 13 through a suitable TR box 14 which limits the amplitude of the pulses appearing at the antenna in such a manner as to prevent injury to the receiver by the transmitted pulses and without offering substantial resistance to the echoes of the transmitted pulses.

In order to display the intelligence received on the antenna there is provided a cathode ray device 15 having a viewing screen 16. The received echo voltages from the receiver are impressed upon control electrode 17 of the cathode ray device, the ray being deflected across the viewing screen in a well known manner in response to suitable energization as by means of the horizontal sweep generator 12 and deflection coils 18 associated therewith, and a suitable vertical sweep generator 19 and deflecting coils 20 associated therewith.

In order to synchronize the operation of the horizontal deflection or sweep of the ray with the transmission of pulses, the horizontal sweep generator 12 is suitably arranged to trigger the transmitter 11 in synchronism with the energization of coils 18. Referring to Fig. 2, there are shown at A illustrative recurrent pulses and at B there are shown horizontal sweep energizing pulses which may be of variable duration.

In accordance with my invention, the sweep frequency of one of the sweep systems is preferably at a frequency substantially different from the frequency of the other sweep system. In the absence of any signal, there will result an appreciable area of illumination on the viewing screen as indicated by the numeral 23. If the frequency of the deflection in the vertical direction is substantially greater than that in the horizontal direction but not so great as completely to fill the viewing area, an observer will be able to note an indistinct vertical lining effect as indicated in Fig. 1.

While my invention is illustrated as providing horizontal and vertical sweeps, it should be understood that these terms are used for clarity of description only. It is sufficient that one sweep system cause deflection of the ray across the viewing screen in one direction and the other sweep system cause deflection of the ray at a substantial angle to the first direction.

In order to display the received echoes on the viewing screen, there is provided a suitable mixing device 24 on which is impressed pulses of blanking voltage suitably derived from horizontal sweep generator 12 as well as the signal or echo voltage from the receiver 13. The resulting signal is impressed on the control electrode or grid 17 as indicated above. The timing of the blanking voltage from horizontal sweep generator 12 is indicated at C in Fig. 2. In the absence of signal, the field 23 is uniformly illuminated. When a signal is transmitted from the antenna, there appears on grid or control electrode 17 a voltage substantially higher than normal representing the transmitted signal and its echoes. The result is a vertical line 21 of the same height as the field 23 and a plurality of additional lines 25 representing echoes of the transmitted pulse indicated at 21. These echoes will have varying degrees of brightness or intensity, the degree of brightness depending upon signal strength. Obviously, the brightest line will correspond to the transmitted signal, which always drives the receiver to maximum output.

Further reference to Fig. 2 may be helpful in understanding the operation of the system illustrated in Fig. 1. Reviewing what has been stated above, the transmitted pulses are represented at A, and at B there are shown the recurrent voltage waves for causing the horizontal sweep of the cathode ray tube. In order to enable the operator to exclude the field beyond the range in which he is interested and hence minimize illumination of the viewing screen by extraneous and undesired signals there is produced a blanking wave in the horizontal sweep generator 12 which is impressed on the mixer as explained above. The more positive portion of the blanking wave (see C in Fig. 2) biases the mixing device 24 so that appearance of echoes in the interval of time corresponding with the positive portions of the blanking wave will result in sufficient voltage on control electrode 17 to cause an increase of illumination at the range corresponding to the signal or echo. During the remaining or less positive portions 28 of the blanking wave, the combined voltage of portions 28 of the blanking wave and the echo will not normally drive the grid 17 sufficiently far in the positive direction to permit electron beam current in the cathode ray device 15. Therefore, signals received during the periods of time indicated by the numeral 28 at C in Fig. 2 will not be displayed on the screen. At D in Fig. 2 there are depicted the transmitted pulses and echoes more nearly as they would be displayed on the conventional "A" type display. The transmitted echoes are indicated by the numerals 21a and the received pulses are indicated by the numerals 25a. These correspond to the vertical lines 21 and 25 respectively in Fig. 1.

The viewing screen can be marked with distances as abscissa if desired in order to indicate the ranges of the objects producing the echoes.

As has been indicated above the more familiar "A" type display is advantageous in that signal strength is more easily determined by noting comparative heights of echoes than by comparing relative intensities. In Fig. 3 there is shown a particular embodiment of my invention which incorporates means for causing echoes to be displayed in such a manner that the height varies according to the intensity of the signal, thereby closely simulating an "A" type display. This system differs from that in Fig. 1 by including a vertical sweep generator 19a arranged to provide not only the sweep voltage but also a beam extinguishing voltage which is impressed on a mixer device 24a after passing through a phase correcting device 29 and suitable clipping means 30.

The phase correcting device is necessary in the arrangement shown in Fig. 3 in order to produce an output voltage which is in phase with the current flowing in coils 20. Although shown as a separate block 29 in Fig. 3, its function may be achieved within the vertical sweep generator 19a.

If the voltage wave from the vertical sweep generator 19a is clipped and mixed with each signal from the receiver 13, only the lower part of the screened area of the viewing screen will have the same appearance as the corresponding part of field 23. This is indicated by the numeral 23a in Fig. 3.

Referring to Fig. 4A, the beam extinguishing wave is represented by the numeral 31. In the absence of any echoes, this wave is clipped at the level indicated by the numeral 32. The lined appearance of the lower portion of the field 23a is due to the fact that the clipped portions 36 of the beam extinguishing wave do not reach the mixer and only that part of the positive portions above the cut off bias of grid 17 (indicated by the line 35) reaches the grid 17 when no signal from receiver 13 is present. Therefore, each portion of the clipped wave 31 above the line 35 traces a vertical line on the field 23a (since positive excursions of wave 31 correspond to downward deflections of the beam in Fig. 3), and during the rest of the time the field remains dark. Since the rise and fall of the voltage is rapid, as the voltage traces upwardly, horizontally and then downwardly during each portion of the beam extinguishing wave cycle above line 35, substantially the same voltages exist on the grid through the energizing portion of the cycle and therefore, substantially even illumination occurs. The intensity of illumination of the field of discharge device 15 of Fig. 3 decreases very rapidly to zero when no signal is present. However, the presence of signal echoes overcomes the beam extinguishing signal and the extent to which the beam extinguishing signal is overcome depends upon the echo signal strength with the result that the visible portion of the upward excursion will be a function of echo strength. A signal or echo is represented by the numeral 33 in Fig. 4B. The addition of the signal 33 to the beam extinguishing wave in the mixer results in an increase of excitation of grid 17. The superimposed echo raises the most negative excursions of the beam extinguishing wave along the dotted locus 34 of Fig. 4C. The higher the signal rises above cutoff, the greater will be the height of the signal 25b on the viewing screen 16 and also the greater the intensity of the representation of the echo. The illumination of each echo will not be uniform as in Fig. 1 but will gradually decrease in the upward direction. Successive traces of the beam extinguishing signal will have different coincidence between the echo signal and the beam extinguishing wave, and the average effect follows the general form of the echo signal itself. The loci of the maximum and minimum values of the displaced successive traces are represented by lines 34 and 34a.

In the system shown in Figs. 1 and 3 the frequency of the vertical sweep voltage is substantially higher than that developed by the horizontal sweep generator. It is within the scope of my invention to cause the horizontal sweep generator to operate at a higher frequency than the vertical sweep frequency. The display obtained and characteristics of such an embodiment of my invention are illustrated in Figs. 5 and 6. The same electrical circuit as illustrated in Fig. 3 is used.

In Fig. 6 there is shown the horizontal sweep voltage wave at A. The vertical sweep voltage of substantially lower frequency, shown at B, may be a sine wave as shown. At C there is shown the vertical wave clipped as indicated by the numeral 37. The vertical lines imposed upon the clipped vertical sweep wave indicate received echoes, each line representing one pulse. Since the ray is sweeping horizontally during each pulse, each pulse will comprise a vertical series of short horizontal lines on Fig. 5. All received echoes having sufficient amplitude to raise the grid 17 above cut off (indicated by numeral 35a in Fig. 6) will be shown above the field 25b in Fig. 5. As was the case with the circuit of Fig. 3 the illumination of the echoes 25c will decrease in the vertical direction.

In order to use the same indicator or cathode ray tube for the type of display using a rotating sweep system whereby not only the distance but also the direction of the echo is displayed, it is necessary only to stop the vertical sweep, adjust the horizontal sweep amplitude and centering, and rotate the coil with the directional antenna. Other types of display within the limits of magnetic deflection technique may be presented on the indicator tube by providing suitable signals on the coils and the grid with conventional circuits.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a cathode ray device having a viewing screen, means to indicate on said screen a periodically recurring effect, said means comprising means to deflect the ray of said device across said screen at the frequency of recurrence of said effect, means to deflect said ray at an angle to the deflection produced by said first means and at a different frequency to illuminate an area of said screen, means to vary the intensity of said ray in accord with said effect to produce a line through said area positioned in accord with the time relation between the respective effect and the deflection produced by said first means, and means responsive to said effect for concurrently increasing the deflection along said line to extend said line beyond said area.

2. In combination, a cathode ray device having a viewing screen, means to indicate on said screen a periodically recurring effect, said means comprising means to deflect the ray of said device across said screen at the frequency of recurrence of said effect, means to deflect said ray at an angle to the deflection produced by said first means and at a different frequency to illuminate an area of said screen, means to vary the intensity of said ray in accord with said effect to produce a line through said area positioned in accord with the time relation between the respective effect and the deflection produced by said first means, and means controlled by said effect for concurrently increasing the deflection along said line to extend said line beyond said area to an extent dependent upon the magnitude of said effect.

3. In combination, a source of recurring electrical effects, a cathode ray device having a viewing screen, and a control electrode, a pair of sources of deflection voltages of different frequency connected and arranged to deflect the ray of said device across said screen in different respective directions thereby to illuminate an area of said screen, one of said voltages having an integral relation to the frequency of recurrence of said effects, means to bias said control electrode to extinguish said ray, means to supply to said control electrode voltage variations of frequency and phase to overcome said bias during a portion of each deflection of said ray produced by said other deflection voltage, and means to supply to said control electrode a voltage opposing said bias and varying in accord with said electrical effect whereby a line is produced extending across said area at a position depending upon the time relation between said recurring electrical effect and the deflection produced by said one deflection voltage, said line extending beyond said area to an extent dependent on the magnitude of said effect.

4. The combination, in a pulse echo system, of means to transmit recurrent pulses and to receive echoes thereof during the intervals between said pulses, a cathode ray device having a viewing screen and an intensity control electrode, means to deflect the ray of said device across said screen once following each of said transmitted pulses, second means to deflect the ray of said device across said screen in a second direction at an angle to the direction of deflection produced by said first deflecting means and at such a frequency that a raster of said screen is traced by said ray, means controlled by said second means for biasing said control electrode to reduce the ray intensity for deflections in said second direction below a predetermined value, said ray normally producing a substantially uniformly illuminated raster for said deflections exceeding said value, and means to reduce said bias in accord with the intensity of received echoes, thereby to produce linear bars across said raster of illumination differing in degree from said uniform illumination, said bars being in positions corresponding to the time of receipt of the respective echoes and extending beyond one edge of said raster by distances dependent on their intensities.

5. The combination, in a pulse echo system, of a cathode ray device having a viewing screen, means for transmitting periodically recurring pulses and for receiving echoes thereof from distant objects, means for deflecting the ray of said device synchronously across said screen along a first coordinate axis during an interval after each transmitted pulse, means for deflecting said ray across said screen along a second coordinate axis at a frequency substantially different from the pulse repetition frequency, means to change the intensity of said ray abruptly in response to magnitudes of said second deflections exceeding a reference value, and means controlled by received pulses for varying said reference value during each pulse by an amount dependent upon the pulse intensity, whereby a substantially rectangular illuminated area is normally produced on said screen with additional deflections extending above an edge thereof and parallel to said second axis, said additional deflections having varying heights dependent on the echo intensities and having positions dependent upon the ranges to the objects producing the respective echoes.

DONALD E. NORGAARD.

REFERENCES CITED

The following references are of record in the file of this patent:

UNITED STATES PATENTS

| Number | Name | Date |
|---|---|---|
| Re. 22,328 | Crosby | June 1, 1943 |
| 1,933,219 | Nakajima | Oct. 31, 1933 |
| 2,243,234 | Von Duhn | May 27, 1941 |
| 2,280,524 | Hansen | Apr. 21, 1942 |
| 2,415,981 | Wolff | Feb. 18, 1947 |
| 2,419,205 | Feldman | Apr. 22, 1947 |
| 2,425,330 | Kenyon | Aug. 12, 1947 |
| 2,426,979 | Ayres | Sept. 9, 1947 |
| 2,426,989 | DeRosa | Sept. 9, 1947 |

FOREIGN PATENTS

| Number | Country | Date |
|---|---|---|
| 520,778 | Great Britain | May 3, 1940 |

Disclaimer 2,465,113.—*Donald E. Norgaard*, Scotia, N. Y. PULSE ECHO SYSTEM. Patent dated Mar. 22, 1949. Disclaimer filed May 29, 1951, by the assignee, *General Electric Company.*

Hereby enters this disclaimer to claims 1, 2, and 3 of said patent.

[*Official Gazette September 4, 1951.*]